United States Patent
Wu et al.

(10) Patent No.: US 12,487,957 B2
(45) Date of Patent: Dec. 2, 2025

(54) USB CIRCUIT, AND SWITCHING METHOD AND APPARATUS FOR USB CONTROLLER

(71) Applicant: SUZHOU METABRAIN INTELLIGENT TECHNOLOGY CO., LTD., Jiangsu (CN)

(72) Inventors: Jianguo Wu, Jiangsu (CN); Changzhao Fu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/878,033

(22) PCT Filed: Nov. 28, 2023

(86) PCT No.: PCT/CN2023/134831
§ 371 (c)(1),
(2) Date: Dec. 21, 2024

(87) PCT Pub. No.: WO2024/187824
PCT Pub. Date: Sep. 19, 2024

(65) Prior Publication Data
US 2025/0165423 A1 May 22, 2025

(30) Foreign Application Priority Data
Mar. 10, 2023 (CN) .......................... 202310227071.4

(51) Int. Cl.
*G06F 13/40* (2006.01)
*G06F 11/22* (2006.01)

(52) U.S. Cl.
CPC ........ *G06F 13/4022* (2013.01); *G06F 11/221* (2013.01); *G06F 2213/0042* (2013.01)

(58) Field of Classification Search
CPC ............... G06F 13/4022; G06F 11/221; G06F 2213/0042
See application file for complete search history.

(56) References Cited

U.S. PATENT DOCUMENTS 6,000,042 A * 12/1999 Henrie ................ G06F 11/2015
714/E11.154
6,256,700 B1 * 7/2001 Sauber ................ G06F 13/4022
710/316
(Continued)

FOREIGN PATENT DOCUMENTS

CN 104063348 A 9/2014
CN 105630726 A 6/2016
(Continued)

OTHER PUBLICATIONS

"USB 2.0 USB 3.0 USB 3.1 USB 3.2 USB 4.0 Connectors and Pinouts", Moddiy.com, Jun. 27, 2022, retrieved from the Internet on Mar. 10, 2025 at <https://www.moddiy.com/pages/USB-2.0-USB-3.0-USB-3.1-USB-3.2-USB-4.0-Connectors-and-Pinouts.html> (Year: 2022).*

Primary Examiner — Faisal M Zaman
(74) Attorney, Agent, or Firm — IPro, PLLC

(57) ABSTRACT

An USB circuit includes a USB socket, USB controllers, a switching switch and a power-supply detecting circuit, and the USB controllers include an operating USB controller and an idle USB controller. The operating USB controller is a USB controller normally connected to the switching switch, and the idle USB controller is a USB controller connected to the switching switch when the operating USB controller has abnormality. The switching switch decomposes a USB signal transmitted in the power line of the USB socket into a plurality of channels of signals, and connects the channels of the USB signals obtained by the decomposing to the operating USB controller and the idle USB controller. The (Continued)

power-supply detecting circuit detects whether the power line of the USB socket outputs an electric current of the USB interface in the USB socket to determine whether the USB interface has been accessed by a USB device.

19 Claims, 7 Drawing Sheets

(56) References Cited

U.S. PATENT DOCUMENTS

| | | | |
|---|---|---|---|
| 6,671,814 B1 | 12/2003 | Kubo et al. | |
| 9,325,521 B2* | 4/2016 | Liu | H04L 12/4625 |
| 2016/0165463 A1* | 6/2016 | Zhang | H04L 43/10 |
| | | | 370/218 |
| 2018/0329851 A1* | 11/2018 | Leng | G06F 13/42 |
| 2018/0336159 A1* | 11/2018 | Kung | G06F 13/4282 |
| 2021/0103539 A1* | 4/2021 | Woodbury | G06F 1/266 |
| 2021/0342115 A1* | 11/2021 | Wareing | G06F 3/1415 |
| 2022/0027300 A1* | 1/2022 | Yu | G06F 9/4411 |

FOREIGN PATENT DOCUMENTS

| | | |
|---|---|---|
| CN | 107546808 A | 1/2018 |
| CN | 109040424 A | 12/2018 |
| CN | 109189707 A | 1/2019 |
| CN | 109976694 A | 7/2019 |
| CN | 115934604 A | 4/2023 |

\* cited by examiner

USB CIRCUIT, AND SWITCHING METHOD AND APPARATUS FOR USB CONTROLLER

CROSS-REFERENCE TO RELATED APPLICATION

The present application claims the priority of the Chinese patent application filed on Mar. 10, 2023 before the Chinese Patent Office with the application number of 202310227071.4 and the title of "USB CIRCUIT, AND SWITCHING METHOD AND APPARATUS FOR USB CONTROLLER", which is incorporated herein in its entirety by reference.

FIELD

The embodiments of the present application relate to the technical field of circuit designing, and particularly relate to a USB circuit, a method for switching USB controllers, an apparatus for switching USB controllers, an electronic device and a non-volatile computer-readable storage medium.

BACKGROUND

In the fields of servers, desktop computers and notebook computers, all of the device machines have external USB (Universal Serial Bus) interfaces. Usually, the quantity of the interfaces is two to five. Regarding a low-weight notebook computer, it might have merely one USB interface, in which case the USB interface is especially important. The devices that the USB interfaces of those devices are externally connected to are diversified, for example, the commonly used USB flash disks, mobile hardware, mice and keyboards. In the currently used USB designing solutions, basically the interfaces of the USB controllers of the CPU (Central Processing Unit) are directly externally connected to the devices, or USB expansion is realized by using the USB HUB (concentrator) chip of the mainboard, to export externally the sockets of type A (the type A common port of USB) or type C (the type C common port of USB) of the externally connected USB.

In the above-described universal solutions, one USB socket corresponds to a single USB controller. In practical usage, the USB devices are frequently hot-plugged. The USB interfaces, as the interfaces of the highest routine usage frequency, bear a large amount of ESD (Electro-Static Discharge) and EOS (Electrical Over Stress) shocks, and, after a long-time usage, USB damage frequently happens. Regarding the physical damages, the time quantity of plugging may be increased by means of increasing the thickness of the gold plating layer and so on. Regarding the electronics, although the interfaces have an ESD chip for protection, long-term shocking by ESD and EOS, or ESD and EOS that exceed the EMC (Electro Magnetic Compliance) standards, result in partial damage of the USB functions relevant to the USB controllers. In this case, the relevant functions of the controllers are lost or partially lost, the particular exhibition of which is that, when a current USB interface is connected, the device is not identified or a driver error is reported, and when it is changed to another USB interface, the device operates normally. What is more serious is that, if a shock that exceeds the EMC experimentation standard happens, the energy damages the CPU. However, on the other hand, usually all of CPUs have redundant USB controller interfaces, and in the general application designs, there are idle USB controller signals that are not used.

From the above-described facts, it can be seen that, on one hand, the external USB interfaces might be damaged, and, on the other hand, the CPU has redundant USB controllers that are not used, which results in waste of the interfaces.

SUMMARY

Some embodiments of the present application provide a USB circuit, a method and apparatus for switching USB controllers, an electronic device and a non-volatile computer-readable storage medium.

In some embodiments, there is provided a USB circuit, wherein the USB circuit comprises a USB socket, USB controllers, a switching switch and a power-supply detecting circuit, each of the switching switch and the power-supply detecting circuit is connected in series to a power line of the USB socket, and the USB controllers include an operating USB controller and an idle USB controller, wherein the operating USB controller is a default USB controller that is, when normally operating, connected to the switching switch, and the idle USB controller is a standby USB controller that is connected to the switching switch when the operating USB controller has abnormality;

the switching switch is configured for decomposing a USB signal transmitted in the power line of the USB socket into a plurality of channels of signals, and connecting the plurality of channels of the USB signals obtained by the decomposing to the operating USB controller and the idle USB controller; and the power-supply detecting circuit is configured for detecting whether the power line of the USB socket outputs an electric current of a USB interface in the USB socket to determine whether the USB interface in the USB socket has been accessed by a USB device.

In some embodiments, the USB circuit comprises at least two instances of the switching switch, and each of the switching switches corresponds to one instance of the USB socket.

In some embodiments, the idle USB controller and the switching switches are in a star connection.

In some embodiments, one instance of the USB socket corresponds to at least one instance of the operating USB controller and one instance of the idle USB controller.

In some embodiments, in response to the operating USB controller having abnormality, a USB signal that was connected to the abnormal USB controller is connected to the idle USB controller by using the switching switch.

In some embodiments, in response to the USB interface in the USB socket having been accessed by a USB device and it being unidentifiable whether the USB interface has been accessed by the USB device, the power-supply detecting circuit detects whether the power line of the USB socket outputs an electric current of the USB interface in the USB socket to determine whether the USB interface in the USB socket has been accessed by the USB device.

In some embodiments, in response to it being detected by the power-supply detecting circuit that the power line of the USB socket outputs an electric current of the USB interface in the USB socket, it is determined that the USB interface in the USB socket has been accessed by the USB device; and in response to it being not detected by the power-supply detecting circuit that the power line of the USB socket outputs an electric current of the USB interface in the USB socket, it is determined that the USB interface in the USB socket is not accessed by a USB device.

In some embodiments, in response to it being unidentifiable whether the USB interface has been accessed by a USB device, it is determined that the operating USB controller is a USB controller having abnormality.

In some embodiments, the USB circuit further comprises a power-supply overcurrent-protection circuit, and the power-supply overcurrent-protection circuit is configured for monitoring whether an electric current of the USB interface in the USB socket is greater than a preset current value.

In some embodiments, a switching chip in the switching switch comprises a selecting lead, and the selecting lead is configured for selecting the operating USB controller or the idle USB controller.

In some embodiments, there is further provided a method for switching USB controllers, wherein the method is applied for the USB circuit stated above, and the method comprises:
  detecting whether the power line of the USB socket outputs an electric current of the USB interface in the USB socket;
  in response to the power line of the USB socket outputting an electric current of the USB interface in the USB socket, detecting whether enumeration of a USB device that has accessed the USB interface succeeds; and
  in response to the enumeration of a USB device that has accessed the USB interface failing, according to a usage state of the idle USB controller, switching the USB controllers.

In some embodiments, the step of detecting whether the power line of the USB socket outputs the electric current of the USB interface in the USB socket comprises:
  in response to the USB interface in the USB socket having been accessed by a USB device and it being unidentifiable whether the USB interface has been accessed by the USB device, by using the power-supply detecting circuit, detecting whether the power line of the USB socket outputs an electric current of the USB interface in the USB socket.

In some embodiments, the method further comprises:
  in response to it being detected by the power-supply detecting circuit that the power line of the USB socket outputs an electric current of the USB interface in the USB socket, determining that the USB interface in the USB socket has been accessed by the USB device; and
  in response to it being not detected by the power-supply detecting circuit that the power line of the USB socket outputs an electric current of the USB interface in the USB socket, determining that the USB interface in the USB socket is not accessed by a USB device.

In some embodiments, the method further comprises:
  in response to the enumeration of a USB device that has accessed the USB interface succeeding, using the operating USB controller to operate.

In some embodiments, the method further comprises:
  in response to the enumeration of a USB device that has accessed the USB interface succeeding, determining that the operating USB controller is in a normal state; and
  in response to the enumeration of a USB device that has accessed the USB interface failing, determining that the operating USB controller is in an abnormal state.

In some embodiments, the step of, according to the usage state of the idle USB controller, switching the USB controllers comprises:
  in response to the idle USB controller being used, using the operating USB controller to operate; and
  in response to the idle USB controller not being used, switching from the operating USB controller to the idle USB controller to operate.

In some embodiments, the method further comprises:
  in response to the operating USB controller being in the abnormal state, connecting a USB signal that was connected to the abnormal operating USB controller to the idle USB controller by using the switching switch.

In some embodiments, the method further comprises:
  in response to the power line of the USB socket outputting an electric current of the USB interface in the USB socket and it is unidentifiable whether the USB interface has been accessed by a USB device, determining that the operating USB controller is a USB controller having abnormality.

In some embodiments, there is further provided an apparatus for switching USB controllers, wherein the apparatus is applied for the USB circuit stated above, and the apparatus comprises:
  a current detecting module configured for detecting whether the power line of the USB socket outputs an electric current of the USB interface in the USB socket;
  an enumeration-state detecting module configured for, in response to the power line of the USB socket outputting an electric current of the USB interface in the USB socket, detecting whether enumeration of a USB device that has accessed the USB interface succeeds; and
  a USB-controller switching module configured for, in response to the enumeration of a USB device that has accessed the USB interface failing, according to a usage state of the idle USB controller, switching the USB controllers.

In some embodiments, the current detecting module is configured for:
  in response to the USB interface in the USB socket having been accessed by a USB device and it being unidentifiable whether the USB interface has been accessed by the USB device, by using the power-supply detecting circuit, detecting whether the power line of the USB socket outputs an electric current of the USB interface in the USB socket.

In some embodiments, the apparatus further comprises:
  a first judging module configured for, in response to it being detected by the power-supply detecting circuit that the power line of the USB socket outputs an electric current of the USB interface in the USB socket, determining that the USB interface in the USB socket has been accessed by the USB device; and
  a second judging module configured for, in response to it being not detected by the power-supply detecting circuit that the power line of the USB socket outputs an electric current of the USB interface in the USB socket, determining that the USB interface in the USB socket is not accessed by a USB device.

In some embodiments, the apparatus further comprises:
  a default-controller operating module configured for, in response to the enumeration of a USB device that has accessed the USB interface succeeding, using the operating USB controller to operate.

In some embodiments, the apparatus further comprises:
  a successful-enumeration module configured for, in response to the enumeration of a USB device that has accessed the USB interface succeeding, determining that the operating USB controller is in a normal state; and
  a failed-enumeration module configured for, in response to the enumeration of a USB device that has accessed the USB interface failing, determining that the operating USB controller is in an abnormal state.

In some embodiments, the USB-controller switching module is configured for:

in response to the idle USB controller being used, using the operating USB controller to operate; and in response to the idle USB controller not being used, switching from the operating USB controller to the idle USB controller to operate.

In some embodiments, the apparatus further comprises:

an idle-USB-controller switching module configured for, in response to the operating USB controller being in the abnormal state, connecting a USB signal that was connected to the abnormal operating USB controller to the idle USB controller by using the switching switch.

In some embodiments, the apparatus further comprises:

an abnormal-USB-controller determining module configured for, in response to the power line of the USB socket outputting an electric current of the USB interface in the USB socket and it is unidentifiable whether the USB interface has been accessed by a USB device, determining that the operating USB controller is a USB controller having abnormality.

In some embodiments, there is further provided an electronic device, wherein the electronic device comprises a processor, a communication interface, a memory and a communication bus, and the processor, the communication interface and the memory complete communication therebetween via the communication bus;

the memory is configured for storing a computer program; and the processor is configured for, when executing the computer program stored in the memory, implementing the method stated above.

In some embodiments, there is further provided a non-volatile computer-readable storage medium, wherein the non-volatile computer-readable storage medium stores an instruction, and the instruction, when executed by one or more processors, causes the processors to implement the method stated above.

In some embodiments, the present application has the following advantages:

In some embodiments, the USB circuit comprises a USB socket, USB controllers, a switching switch and a power-supply detecting circuit, each of the switching switch and the power-supply detecting circuit is connected in series to a power line of the USB socket, and the USB controllers include an operating USB controller and an idle USB controller, wherein the operating USB controller is a default USB controller that is, when normally operating, connected to the switching switch, and the idle USB controller is a standby USB controller that is connected to the switching switch when the operating USB controller has abnormality. The switching switch is configured for decomposing a USB signal transmitted in the power line of the USB socket into a plurality of channels of signals, and connecting the plurality of channels of the USB signals obtained by the decomposing to the operating USB controller and the idle USB controller. The power-supply detecting circuit is configured for detecting whether the power line of the USB socket outputs an electric current of a USB interface in the USB socket to determine whether the USB interface in the USB socket has been accessed by a USB device. In some embodiments, by adding the switching switch that is connected to the operating USB controller and the idle USB controller, the switching switch may, when one of the USB controllers malfunctions, switch to the backup USB controller, thereby sufficiently utilizing the idle USB controller as a backup, so as to realize the backing-up of the external USB sockets. The process of the switching is a fully automated operation, and does not affect the usage by the user, thereby improving the reliability of the external USB interfaces, so as to prevent, during the long-term usage of the device, failure of the USB interfaces caused by excessive external ESD and EOS, which prolongs the service life of the USB socket interfaces and saves the cost. Moreover, the power-supply detecting circuit is added in the power line of the USB socket, and may detect the electric current of the USB interface in the USB socket, and, by detecting the existence or non-existence of the electric current, determine whether a USB device has been inserted into the external USB socket or not, which simplifies the steps of the device identification.

Moreover, when the USB interface in the USB socket has been accessed by a USB device, it may be detected by the power-supply detecting circuit that the power line of the USB socket outputs an electric current. If, at this point, the enumeration (identification on a USB device by the main control) fails, or, in other words, an inserted USB device cannot be identified, then damage of the USB controller or damage of the main control device that controls the USB controller may be determined. In this case, the switching switch may be used to switch the operating USB controller to the idle USB controller to realize the backing-up, which improves the reliability of the external USB interfaces. In addition, if merely the switching switch is added but the power-supply detecting circuit is not added, the switching of the USB controllers may still be performed. However, when, similarly, the USB interface in the USB socket has been accessed by a USB device and the enumeration fails, the main control device firstly considers that the USB interface in the USB socket is not inserted by a USB device but does not consider that the USB controller is damaged; in other words, it cannot determine the problematic device immediately. However, if the power-supply detecting circuit is added, the power-supply detecting circuit may be used to detect that the power line of the USB socket outputs an electric current, and accordingly it may be determined that what is damaged is the USB controller. If, in this case, the power-supply detecting circuit does not identify that an electric current passes, then it may be determined that what is damaged is the accessing USB device. Therefore, by the enumeration state of a USB device and the mutual operation and influence with the power-supply detecting circuit, the problematic device may be accurately and quickly determined, which saves the time spent on the determination on the problematic device, and effectively improves the reliability of the USB interfaces.

DETAILED DESCRIPTION

Figure 1:
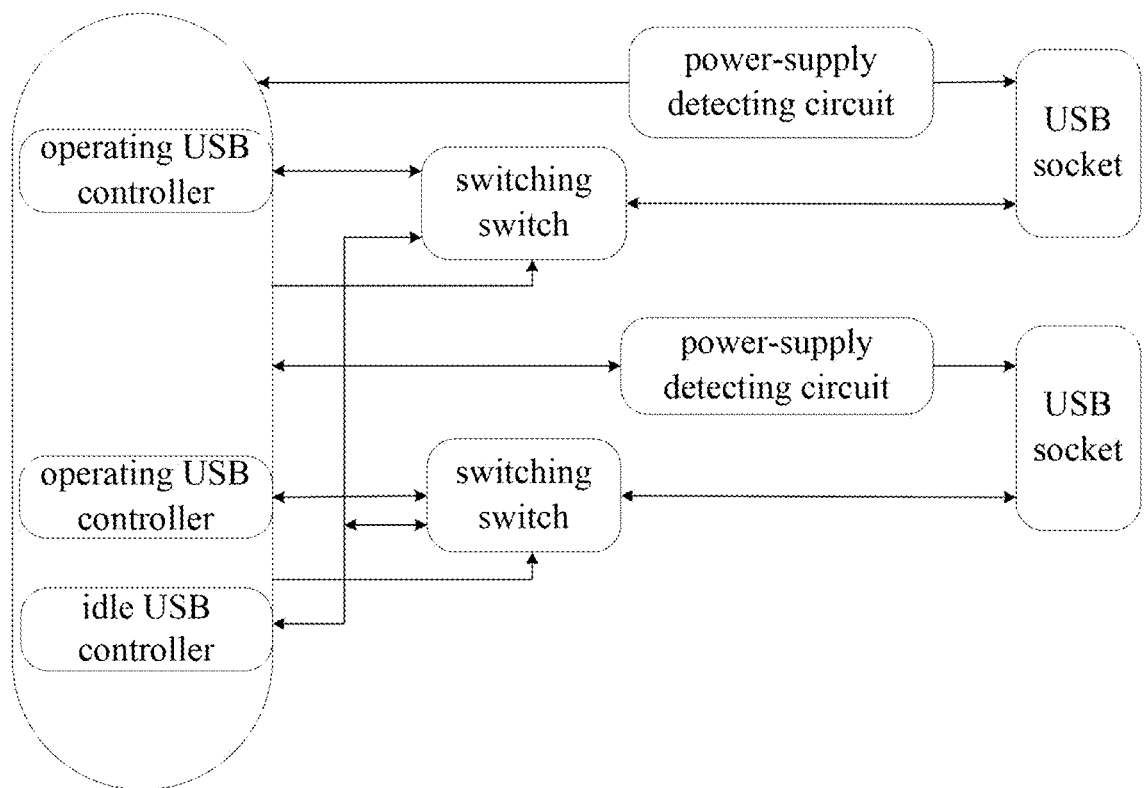
FIG. 1 is a schematic structural diagram of a USB circuit according to some embodiments of the present application.

In order to make the above purposes, features and advantages of the present application more apparent and understandable, the present application will be described in further detail below with reference to the drawings and the particular embodiments.

As an example, in the common solutions of designing USB circuits, one USB socket corresponds to a single USB controller. The USB controller interfaces of the CPU may be directly externally connected, or USB expansion may be realized by using the USB HUB chip of the mainboard; in other words, the USB HUB chip may be split into two channels to be connected to two different USB sockets. In practical usage, the USB devices are frequently hot-plugged. The USB interfaces, as the interfaces of the highest routine usage frequency, bear a large amount of ESD and EOS shocks, and, after a long-time usage, USB damage frequently happens. Regarding the physical damages, the time quantity of plugging may be increased by means of increasing the thickness of the gold plating layer and so on. Regarding the electronics, although the interfaces have an ESD chip for protection, long-term shocking by ESD and EOS, or ESD and EOS that exceed the EMC standards, result in partial damage of the USB functions relevant to the USB controllers. In this case, the relevant functions of the controllers are lost or partially lost, the particular exhibition of which is that, when a current USB interface is connected, the device is not identified or a driver error is reported, and when it is changed to another USB interface, the device operates normally. What is more serious is that, if a shock that exceeds the EMC experimentation standard happens, the energy damages the CPU. However, on the other hand, usually all of CPUs have redundant USB controller interfaces, and in the general application designs, there are idle USB controller signals that are not used. From the above-described facts, it can be seen that, on one hand, the external USB interfaces might be damaged, and, on the other hand, the CPU has redundant USB controllers that are not used, which results in waste of the interfaces.

Therefore, one of the core inventive concepts of the present application is that the USB circuit comprises a USB socket, USB controllers, a switching switch and a power-supply detecting circuit, each of the switching switch and the power-supply detecting circuit is connected in series to a power line of the USB socket, and the USB controllers include an operating USB controller and an idle USB controller, wherein the operating USB controller is a default USB controller that is, when normally operating, connected to the switching switch, and the idle USB controller is a standby USB controller that is connected to the switching switch when the operating USB controller has abnormality. The switching switch is configured for decomposing a USB signal transmitted in the power line of the USB socket into a plurality of channels of signals, and connecting the plurality of channels of the USB signals obtained by the decomposing to the operating USB controller and the idle USB controller. The power-supply detecting circuit is configured for detecting whether the power line of the USB socket outputs an electric current of a USB interface in the USB socket to determine whether the USB interface in the USB socket has been accessed by a USB device. In some embodiments, by adding the switching switch that is connected to the operating USB controller and the idle USB controller, the switching switch may, when one of the USB controllers malfunctions, switch to the backup USB controller, thereby sufficiently utilizing the idle USB controller as a backup, so as to realize the backing-up of the external USB sockets. The process of the switching is a fully automated operation, and does not affect the usage by the user, thereby improving the reliability of the external USB interfaces, so as to prevent, during the long-term usage of the device, failure of the USB interfaces caused by excessive external ESD and EOS, which prolongs the service life of the USB socket interfaces and saves the cost. Moreover, the power-supply detecting circuit is added in the power line of the USB socket, and may detect the electric current of the USB interface in the USB socket, and, by detecting the existence or non-existence of the electric current, determine whether a USB device has been inserted into the external USB socket or not, which simplifies the steps of the device identification.

Moreover, when the USB interface in the USB socket has been accessed by a USB device, it may be detected by the power-supply detecting circuit that the power line of the USB socket outputs an electric current. If, at this point, the enumeration (identification on a USB device by the main control) fails, or, in other words, an inserted USB device cannot be identified, then damage of the USB controller or damage of the main control device that controls the USB controller may be determined. In this case, the switching switch may be used to switch the operating USB controller to the idle USB controller to realize the backing-up, which improves the reliability of the external USB interfaces. In addition, if merely the switching switch is added but the power-supply detecting circuit is not added, the switching of the USB controllers may still be performed. However, when, similarly, the USB interface in the USB socket has been accessed by a USB device and the enumeration fails, the main control device firstly considers that the USB interface in the USB socket is not inserted by a USB device but does not consider that the USB controller is damaged; in other words, it cannot determine the problematic device immediately. However, if the power-supply detecting circuit is added, the power-supply detecting circuit may be used to detect that the power line of the USB socket outputs an electric current, and accordingly it may be determined that what is damaged is the USB controller. If, in this case, the power-supply detecting circuit does not identify that an electric current passes, then it may be determined that what is damaged is the accessing USB device. Therefore, by the enumeration state of a USB device and the mutual operation and influence with the power-supply detecting circuit, the problematic device may be accurately and quickly determined, which saves the time spent on the determination on the problematic device, and effectively improves the reliability of the USB interfaces.

Referring to FIG. 1, FIG. 1 shows a schematic structural diagram of a USB circuit according to some embodiments of the present application. The USB circuit comprises a USB socket, USB controllers, a switching switch and a power-supply detecting circuit, each of the switching switch and the power-supply detecting circuit is connected in series to a power line of the USB socket, and the USB controllers include an operating USB controller and an idle USB controller, wherein the operating USB controller is a default USB controller that is, when normally operating, connected to the switching switch, and the idle USB controller is a standby USB controller that is connected to the switching switch when the operating USB controller has abnormality.

The switching switch is configured for decomposing a USB signal transmitted in the power line of the USB socket into a plurality of channels of signals, and connecting the plurality of channels of the USB signals obtained by the decomposing to the operating USB controller and the idle USB controller.

The power-supply detecting circuit is configured for detecting whether the power line of the USB socket outputs an electric current of a USB interface in the USB socket to determine whether the USB interface in the USB socket has been accessed by a USB device.

The switching switch may have a built-in switching chip, the switching chip may comprise a selecting lead, and the selecting lead may be configured for selecting the operating USB controller or the idle USB controller. In some embodiments, the switching switch may be configured for decomposing a USB signal transmitted in the power line of the USB socket into a plurality of channels of signals, and connecting the plurality of channels of the USB signals obtained by the decomposing to the operating USB controller and the idle USB controller. It can be understood that, by using the switching chip in the switching switch, the USB signal of the USB socket may be split into two channels, wherein one of the channels is directly connected to the normally used USB controller, and the other of the channels is collectively connected to the idle USB controller.

In some embodiments, the USB circuit comprises at least two switching switches, each of the switching switches corresponds to one USB socket, and one USB socket corresponds to at least one operating USB controller and one idle USB controller. It can be understood that, by using the switching switch, the USB signal of the USB socket may be split into two channels, wherein one of the channels is directly connected to the normally used USB controller, and the other of the channels is collectively connected to the idle USB controller. When there are two switching switches, it can be ensured that, when one of the switching switches has abnormality, the other switch performs the switching, so as to prevent the case in which, when all of the USB controllers and the switching switch have abnormality, the USB interfaces are unusable or unidentifiable. Furthermore, when the operating USB controller has abnormality, the USB signal that was connected to the abnormal USB controller may be connected to the idle USB controller by using the switching switch, so as to realize the backing-up of the external USB sockets.

In some embodiments, the idle USB controller and the switching switches are in a star connection. As an example, by using the star connection, when the switching switches are performing the backing-up, merely one of the switching switches may be conducted with the idle USB controller, which prevents two switching switches from being simultaneously conducted with the same one idle USB controller.

It should be noted that, because the idle USB controller is connected to all of the USB switching switches, in order to ensure that the STUBs (the lengths of the branches of the wiring of PCB (PCB (Printed Circuit Board)) of the signals of the idle USB controller are the shortest, the signals of the idle USB controller are required to be in a star connection. When the switching switches are performing the backing-up, merely one of the switching switches may be switched on, so as to ensure that the STUBs of the signals are the shortest to ensure the integrity of the signals.

The STUBs may refer to the lengths of the branches of the PCB wiring. It should be noted that, if the lengths of the branches of the PCB wiring increase, that affects the signal integrity. Therefore, it is required to ensure that the STUBs of the signals are the shortest.

In some embodiments, one switching switch may be connected to the operating USB controller and the idle USB controller. Assuming that a normally operating USB controller has abnormality, the switching switch may be used to switch to the idle USB controller, thereby sufficiently utilizing the idle USB controller as a backup, so as to realize the backing-up of the external USB sockets, and prevent failure of the USB interfaces caused by excessive external ESD and EOS, which prolongs the service life of the USB socket interfaces and saves the cost.

The power-supply detecting circuit may perform the USB power-supply detection by using an electric-current detecting chip, and the power-supply detecting circuit may be configured for detecting whether the power line of the USB socket outputs an electric current of the USB interface in the USB socket to determine whether the USB interface in the USB socket has been accessed by a USB device. It can be understood that, if the power line of the USB socket outputs an electric current of the USB interface in the USB socket, it may be identified that a USB device has accessed. In contrast, if the power line of the USB socket does not output an electric current of the USB interface in the USB socket, it may be determined that no USB device accesses.

In some embodiments, assuming that the USB interface has been accessed by a USB device, if the USB signal is partially broken, which causes that the CPU serving as the central controller cannot identify whether a USB device has been connected, the power-supply detecting circuit may be used to detect whether an outputted electric current exists in the power line of the USB socket. If it has been detected that an electric current passes through the power line of the USB socket, it may be determined that the USB interface has been accessed by a USB device. However, in this case, if a USB device accessing the USB interface still cannot be identified, that may indicate that the USB controller is problematic. In this case, the CPU may, by using the corresponding GPIO (General Purpose Input Output), control the switching chip of the corresponding switching switch, to switch the interface of the problematic USB controller to the interface of the idle USB controller, so as to realize the backing-up of the USB socket interfaces.

In some embodiments, when the USB interface in the USB socket has been accessed by a USB device and it is unidentifiable whether the USB interface has been accessed by the USB device, the power-supply detecting circuit detects whether the power line of the USB socket outputs an electric current of the USB interface in the USB socket to determine whether the USB interface in the USB socket has been accessed by the USB device.

In a particular implementation, when the USB interface in the USB socket has been accessed by a USB device and it is unidentifiable whether the USB interface has been accessed by the USB device, the power-supply detecting circuit detects whether the power line of the USB socket outputs an electric current of the USB interface in the USB socket to determine whether the USB interface in the USB socket has been accessed by the USB device. In some embodiments, if it is detected by the power-supply detecting circuit that the power line of the USB socket outputs an electric current of the USB interface in the USB socket, it is determined that the USB interface in the USB socket has been accessed by the USB device; and if it is not detected by the power-supply detecting circuit that the power line of the USB socket outputs an electric current of the USB interface in the USB socket, it is determined that the USB interface in the USB socket is not accessed by a USB device.

In some embodiments, assuming that the USB interface has been accessed by a USB device, when the USB interface in the USB socket has been accessed by a USB device and it is unidentifiable whether the USB interface has been accessed by the USB device, the power-supply detecting circuit may be used to detect whether an outputted electric current exists in the power line of the USB socket. If it has been detected that an electric current passes through the power line of the USB socket, it may be determined that the USB interface has been accessed by a USB device. If it is not detected that an electric current passes through the power line of the USB socket, it may be determined that the USB interface is not accessed by a USB device.

In some embodiments, if the CPU or the central controller cannot identify whether the USB interface has been accessed by a USB device, then it may be determined that the operating USB controller is a USB controller having abnormality. When the operating USB controller has abnormality, the switching switch may be used to switch to the idle USB controller, so as to realize the backing-up of the external USB sockets.

In some embodiments, the USB circuit further comprises a power-supply overcurrent-protection circuit, and the power-supply overcurrent-protection circuit is configured for monitoring whether an electric current of the USB interface in the USB socket is greater than a preset current value. In some embodiments, when an electric current of the USB interface in the USB socket is greater than the preset current value, then a current-protection measure is employed, so as to effectively deal with the shock by ESD and EOS.

In some embodiments, the USB circuit comprises a USB socket, USB controllers, a switching switch and a power-supply detecting circuit, each of the switching switch and the power-supply detecting circuit is connected in series to a power line of the USB socket, and the USB controllers include an operating USB controller and an idle USB controller, wherein the operating USB controller is a default USB controller that is, when normally operating, connected to the switching switch, and the idle USB controller is a standby USB controller that is connected to the switching switch when the operating USB controller has abnormality. The switching switch is configured for decomposing a USB signal transmitted in the power line of the USB socket into a plurality of channels of signals, and connecting the plurality of channels of the USB signals obtained by the decomposing to the operating USB controller and the idle USB controller. The power-supply detecting circuit is configured for detecting whether the power line of the USB socket outputs an electric current of a USB interface in the USB socket to determine whether the USB interface in the USB socket has been accessed by a USB device. In some embodiments, by adding the switching switch that is connected to the operating USB controller and the idle USB controller, the switching switch may, when one of the USB controllers malfunctions, switch to the backup USB controller, thereby sufficiently utilizing the idle USB controller as a backup, so as to realize the backing-up of the external USB sockets. The process of the switching is a fully automated operation, and does not affect the usage by the user, thereby improving the reliability of the external USB interfaces, so as to prevent, during the long-term usage of the device, failure of the USB interfaces caused by excessive external ESD and EOS, which prolongs the service life of the USB socket interfaces and saves the cost. Moreover, the power-supply detecting circuit is added in the power line of the USB socket, and may detect the electric current of the USB interface in the USB socket, and, by detecting the existence or non-existence of the electric current, determine whether a USB device has been inserted into the external USB socket or not, which simplifies the steps of the device identification.

Figure 2:
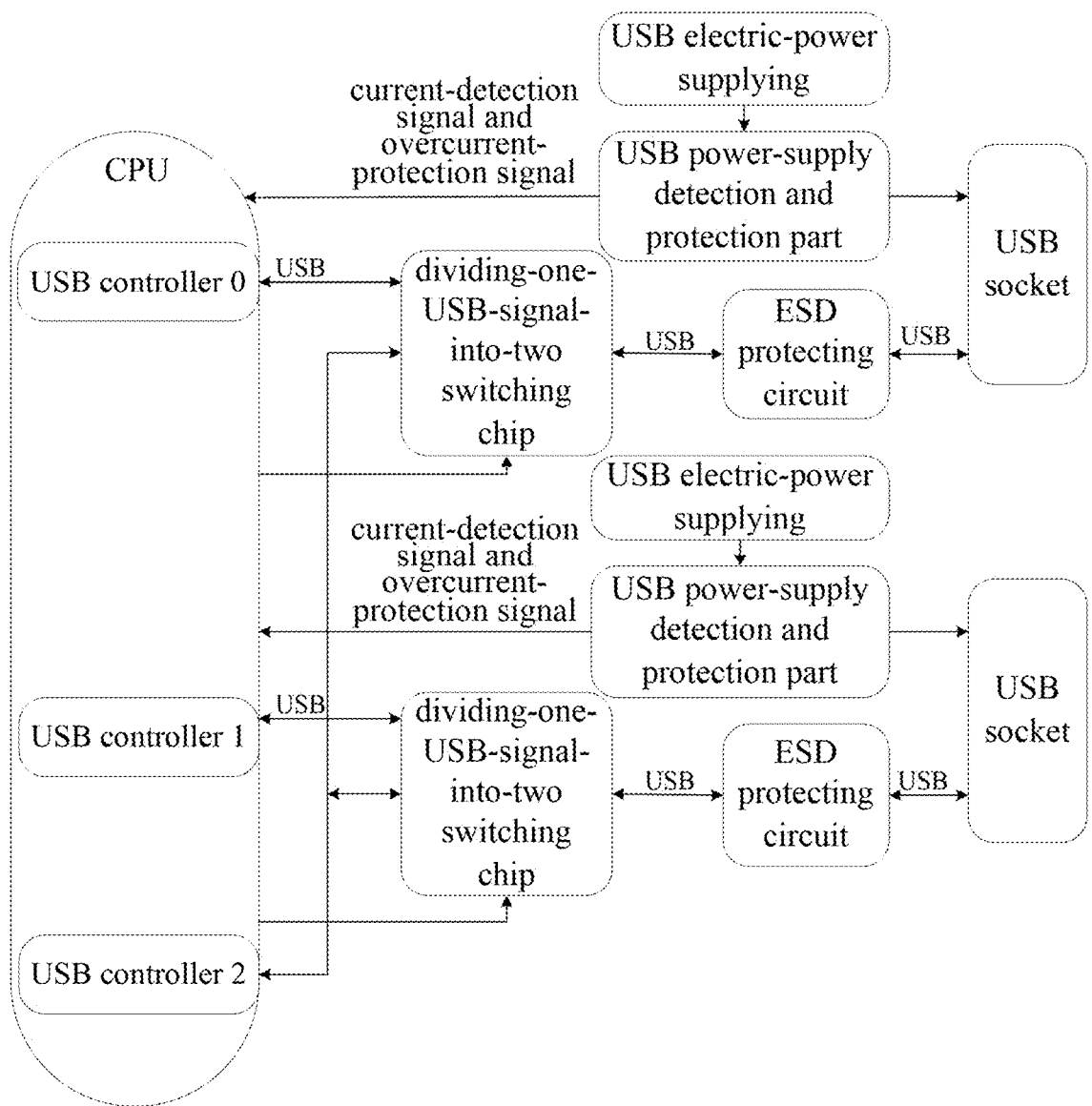
FIG. 2 is a first structural block diagram of a USB circuit according to some embodiments of the present application.

In order to enable a person skilled in the art to comprehend the technical solutions of the present application better, the technical solutions of the present application will be illustratively described below with reference to an example:

Referring to FIG. 2, FIG. 2 shows a first structural block diagram of a USB circuit according to some embodiments of the present application.

As shown in FIG. 2, the figure illustrates by taking two external USB sockets as an example. It should be noted that the same principle is also applicable to a plurality of USB sockets, and in order to facilitate the description, the data are set to be simple. It can be understood that the quantities of the nodes such as the switching switch, the USB socket, the USB controllers and the power-supply detecting circuit are not limited in some embodiments of the present application, and may be regulated by a person skilled in the art according to practical situations.

As shown in FIG. 2, merely one USB controller provides the backing-up to all of the USBs. In some embodiments, the USB-signal channels are connected to a switching switch formed by dividing-one-USB-signal-into-two switching chips. By using the switching switch, the USB signal of the USB socket may be split into two channels, one of the channels is directly connected to the normally used USB controller (for example, the USB controller 0 and the USB controller 1 in FIG. 2), and the other of the channels is connected to the idle USB controller (for example, the USB controller 2 in FIG. 2). In the above embodiment, because the idle USB controller is connected to all of the switching switches, in order to ensure that the STUBs of the signals are the shortest, the signals of the idle USB controller are required to be in a star connection; in other words, the switching switches and the idle USB controller are in a star connection. When the switching switches are performing the backing-up, merely one of the switching switches may be switched on.

The power-supply detecting part uses the electric-current detecting chip to form the power-supply detecting circuit (for example, the USB power-supply detection and protection parts in FIG. 2) to perform the USB power-supply detection, the purpose of which is to detect whether the USB interface is connected to a USB device. After the USB interface has been accessed by a USB device, if the USB signal is partially broken, and it is unidentifiable whether a USB device has accessed, the power-supply detecting circuit is used to detect the electric current in the power supply, whereby it may be determined, according to the electric current existing in the power line, that the USB interface has been accessed by a USB device. If the USB cannot be identified, that indicates that the USB controller is problematic. In this case, the CPU may control the corresponding switching chip by using the corresponding GPIO, to switch the problematic USB interface to the idle USB interface, so as to realize the backing-up of the USB socket interfaces.

When the electric circuit in FIG. 2 is used, because there is merely one idle USB controller, it may cover merely one problematic USB interface.

Figure 3:
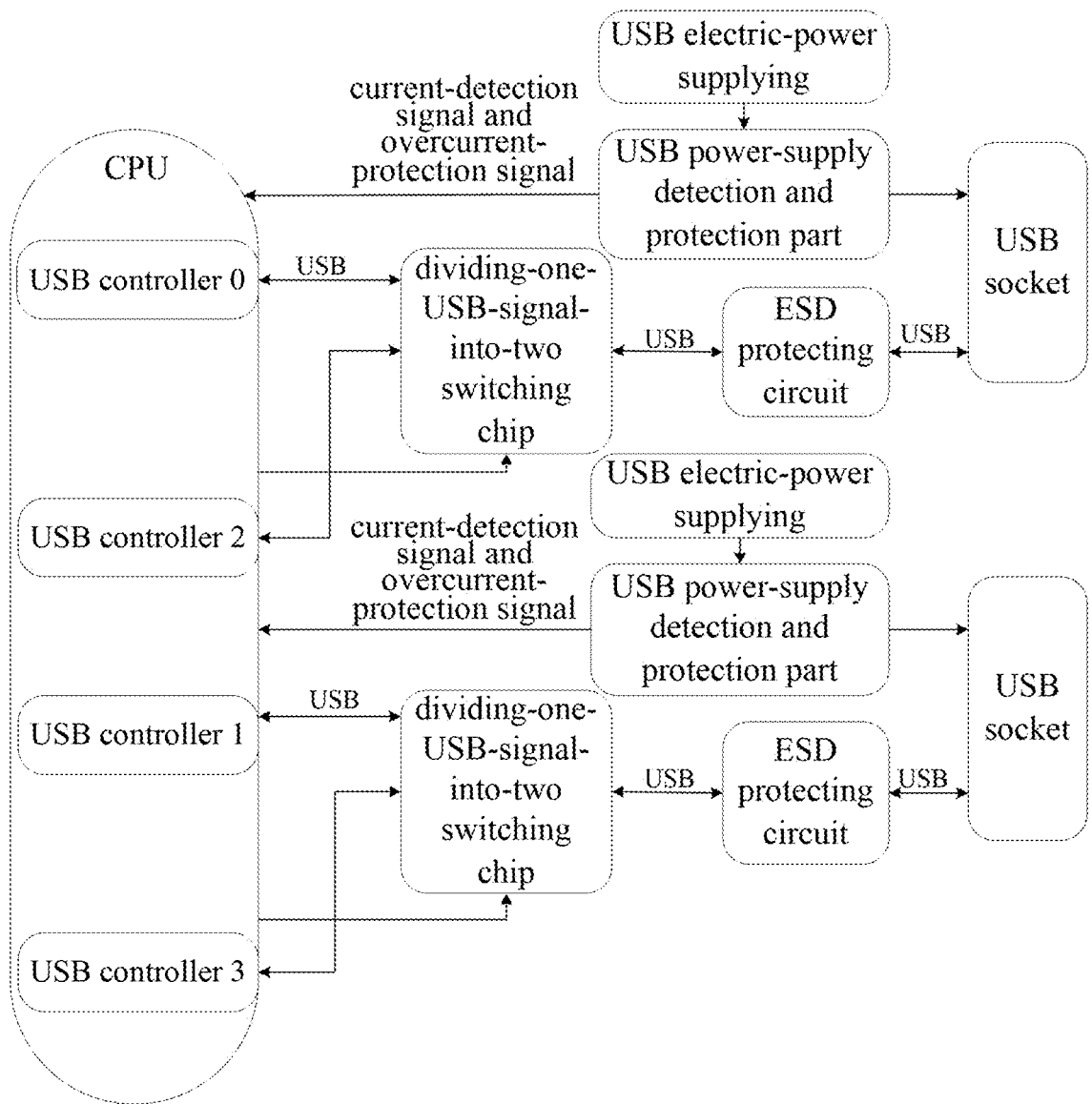
FIG. 3 is a second structural block diagram of a USB circuit according to some embodiments of the present application.

Further, referring to FIG. 3, FIG. 3 shows a second structural block diagram of a USB circuit according to some embodiments of the present application. The switching switch is similarly a one-switching-two switch. What is different from the USB circuit in FIG. 2 is that the USB interfaces of the different external USB sockets are grouped, and they are backed up to different idle USB controllers according to the grades of the groups. In this case, the one-switching-two switching switch may be used, whereby the control logic is simple and easy to operate, and it may be realized that the external USB interfaces are in different groups. If the interfaces of two USB controllers are broken, the interfaces of the other USB controllers may still be continuously used, so as to realize the backing-up of the external USB sockets.

In some embodiments, as shown in FIG. 3, the USB controller 0 and the USB controller 2 is one group, and the USB controller 1 and the USB controller 3 is one group. The switching switch formed by the dividing-one-USB-signal-into-two switching chips is connected to the two groups, whereby it may be realized that the interfaces of the USB controllers are in different groups. If the interfaces of two USB controllers are broken, the interfaces of the other USB controllers may still be continuously used, so as to realize the backing-up of the external USB sockets.

Figure 4:
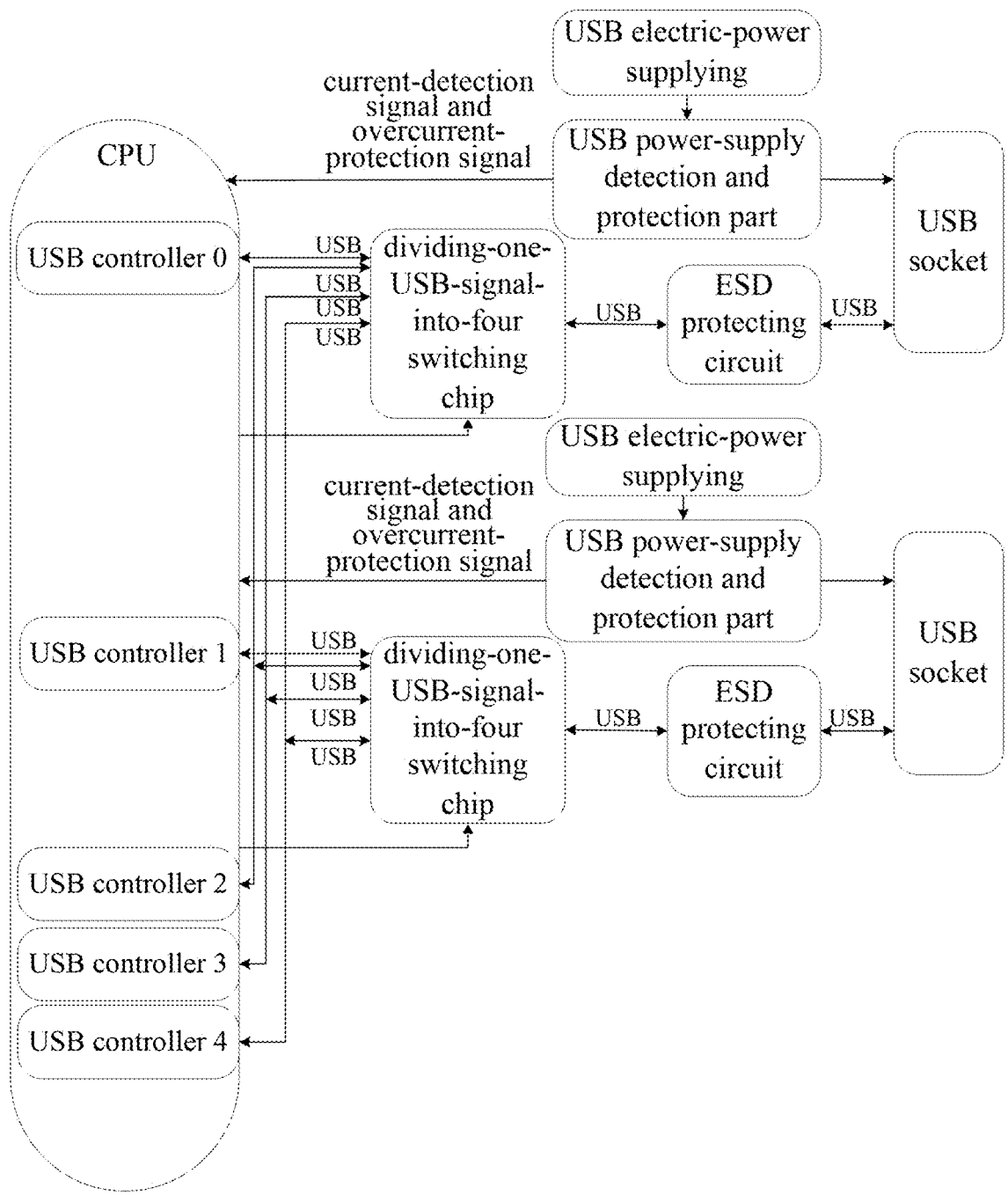
FIG. 4 is a third structural block diagram of a USB circuit according to some embodiments of the present application.

Referring to FIG. 4, FIG. 4 shows a third structural block diagram of a USB circuit according to some embodiments of the present application.

As shown in FIG. 4, in this case, the switching switch of the USB circuit may be changed into a one-switching-four switching switch, i.e., the switching switch formed by the dividing-one-USB-signal-into-four switching chips in FIG. 4. In the USB circuit in FIG. 4, each of the USB interfaces may be connected to at most 3 idle USB controllers, whereby each of the external USB interfaces may have 3 backups, or three external USB interfaces may have a single backup. It can be understood that the recovery after damage of 3 USB interfaces may be satisfied at the same time, or one USB interface may still be usable after damages of 3 times. It should be noted that the relevant principle is similar to the principles of the implementation of the USB circuits in FIGS. 2 and 3, and the principle of the USB circuit in FIG. 4 is not discussed further herein.

In some embodiments, the USB circuit comprises a USB socket, USB controllers, a switching switch and a power-supply detecting circuit, each of the switching switch and the power-supply detecting circuit is connected in series to a power line of the USB socket, and the USB controllers include an operating USB controller and an idle USB controller, wherein the operating USB controller is a default USB controller that is, when normally operating, connected to the switching switch, and the idle USB controller is a standby USB controller that is connected to the switching switch when the operating USB controller has abnormality. The switching switch is configured for decomposing a USB signal transmitted in the power line of the USB socket into a plurality of channels of signals, and connecting the plurality of channels of the USB signals obtained by the decomposing to the operating USB controller and the idle USB controller. The power-supply detecting circuit is configured for detecting whether the power line of the USB socket outputs an electric current of a USB interface in the USB socket to determine whether the USB interface in the USB socket has been accessed by a USB device. In some embodiments, by adding the switching switch that is connected to the operating USB controller and the idle USB controller, the switching switch may, when one of the USB controllers malfunctions, switch to the backup USB controller, thereby sufficiently utilizing the idle USB controller as a backup, so as to realize the backing-up of the external USB sockets. The process of the switching is a fully automated operation, and does not affect the usage by the user, thereby improving the reliability of the external USB interfaces, so as to prevent, during the long-term usage of the device, failure of the USB interfaces caused by excessive external ESD and EOS, which prolongs the service life of the USB socket interfaces and saves the cost. Moreover, the power-supply detecting circuit is added in the power line of the USB socket, and may detect the electric current of the USB interface in the USB socket, and, by detecting the existence or non-existence of the electric current, determine whether a USB device has been inserted into the external USB socket or not, which simplifies the steps of the device identification.

Figure 5:
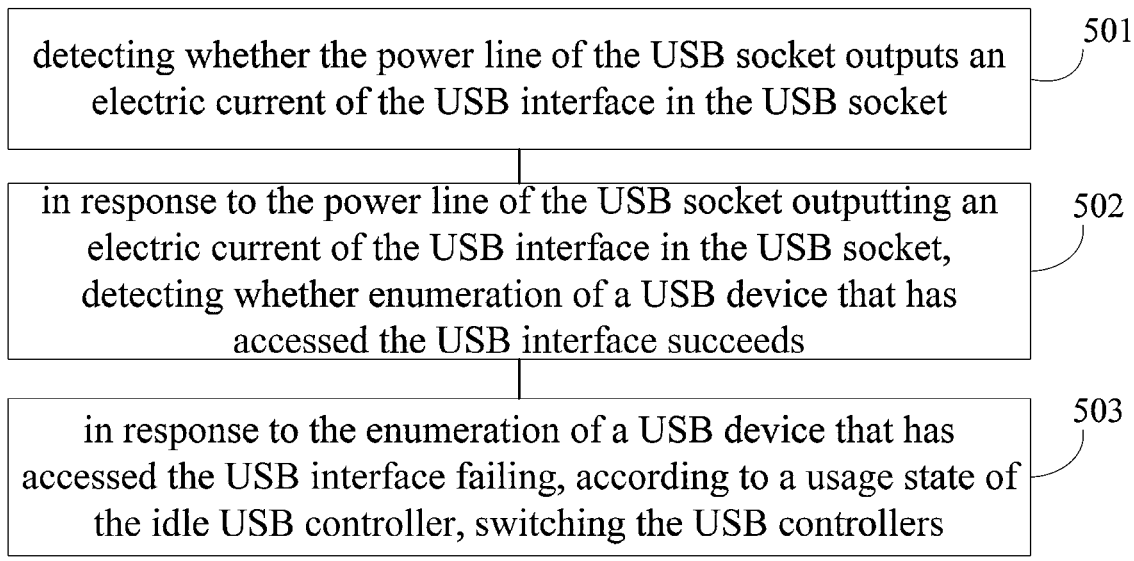
FIG. 5 is a flow chart of the steps of a method for switching USB controllers according to some embodiments of the present application.

Referring to FIG. 5, FIG. 5 shows a flow chart of the steps of a method for switching USB controllers according to some embodiments of the present application. The method may particularly comprise the following steps:

Step 501: detecting whether the power line of the USB socket outputs an electric current of the USB interface in the USB socket.

In a particular implementation, when the USB interface in the USB socket has been accessed by a USB device and it is unidentifiable whether the USB interface has been accessed by the USB device, by using the power-supply detecting circuit, it is detected whether the power line of the USB socket outputs an electric current of the USB interface in the USB socket.

In some embodiments, the method further comprises: if it is detected by the power-supply detecting circuit that the power line of the USB socket outputs an electric current of the USB interface in the USB socket, determining that the USB interface in the USB socket has been accessed by the USB device; and if it is not detected by the power-supply detecting circuit that the power line of the USB socket outputs an electric current of the USB interface in the USB socket, determining that the USB interface in the USB socket is not accessed by a USB device.

In some embodiments, assuming that the USB interface has been accessed by a USB device, when the USB interface in the USB socket has been accessed by a USB device and it is unidentifiable whether the USB interface has been accessed by the USB device, the power-supply detecting circuit may be used to detect whether an outputted electric current exists in the power line of the USB socket. If it has been detected that an electric current passes through the power line of the USB socket, it may be determined that the USB interface has been accessed by a USB device. If it is not detected that an electric current passes through the power line of the USB socket, it may be determined that the USB interface is not accessed by a USB device. That simplifies the operation steps.

In another example, if the power line of the USB socket outputs an electric current of the USB interface in the USB socket and it is unidentifiable whether the USB interface has been accessed by a USB device, then it may be determined that the operating USB controller is a USB controller having abnormality. When the operating USB controller has abnormality, the switching switch may be used to switch to the idle USB controller, so as to realize the backing-up of the external USB sockets.

Step 502: in response to the power line of the USB socket outputting an electric current of the USB interface in the USB socket, detecting whether enumeration of a USB device that has accessed the USB interface succeeds.

In a particular implementation, if the power line of the USB socket outputs an electric current of the USB interface in the USB socket, then it is detected whether the enumeration (the process of identifying a USB device) of a USB device that has accessed the USB interface succeeds. In some embodiments, if the enumeration of a USB device that has accessed the USB interface succeeds (in other words, a USB device has been identified), the operating USB controller is used to operate, thereby sufficiently utilizing the idle USB controller as a backup, so as to realize the backing-up of the external USB sockets.

In some embodiments, the method further comprises: if the enumeration of a USB device that has accessed the USB interface succeeds, determining that the operating USB controller is in a normal state; and if the enumeration of a USB device that has accessed the USB interface fails (in other words, no USB device is identified), determining that the operating USB controller is in an abnormal state. In some embodiments, the method further comprises: if the operating USB controller is in the abnormal state, connecting a USB signal that was connected to the abnormal operating USB controller to the idle USB controller by using the switching switch. The process of the switching is a fully automated operation, and does not affect the usage by the user, thereby improving the reliability of the external USB interfaces.

Step 503: in response to the enumeration of a USB device that has accessed the USB interface failing, according to a usage state of the idle USB controller, switching the USB controllers.

In a particular implementation, if the enumeration of a USB device that has accessed the USB interface fails, according to the usage state of the idle USB controller, the USB controllers are switched. In some embodiments, the method further comprises: if the idle USB controller is being used, using the operating USB controller to operate, and if the idle USB controller is not being used, switching from the operating USB controller to the idle USB controller to operate.

In some embodiments, the method is applied for the USB circuit stated above, by detecting whether the power line of the USB socket outputs an electric current of the USB interface in the USB socket, if the power line of the USB socket outputs an electric current of the USB interface in the USB socket, detecting whether enumeration of a USB device that has accessed the USB interface succeeds, and if the enumeration of a USB device that has accessed the USB interface fails, according to a usage state of the idle USB controller, switching the USB controllers. In some embodiments, by detecting the electric current in the power line of the USB socket, and by the existence or non-existence of a power-supply current, it is determined whether a USB device has been inserted into the external USB socket or not, and, at the same time, by referring to the enumeration state of a USB device, it is determined whether the USB controller is normal. If a USB device is unidentifiable or not enumerated due to abnormality of the USB controller, then the recovery of the normal function of the USB interface may be realized by switching the USB controllers, thereby improving the robustness and the reliability of the external USB interfaces.

Moreover, when the USB interface in the USB socket has been accessed by a USB device, it may be detected by the power-supply detecting circuit that the power line of the USB socket outputs an electric current. If, at this point, the enumeration (identification on a USB device by the main control) fails, or, in other words, an inserted USB device cannot be identified, then damage of the USB controller or damage of the main control device that controls the USB controller may be determined. In this case, the switching switch may be used to switch the operating USB controller to the idle USB controller to realize the backing-up, which improves the reliability of the external USB interfaces. In addition, if merely the switching switch is added but the power-supply detecting circuit is not added, the switching of the USB controllers may still be performed. However, when, similarly, the USB interface in the USB socket has been accessed by a USB device and the enumeration fails, the main control device firstly considers that the USB interface in the USB socket is not inserted by a USB device but does not consider that the USB controller is damaged; in other words, it cannot determine the problematic device immediately. However, if the power-supply detecting circuit is added, the power-supply detecting circuit may be used to detect that the power line of the USB socket outputs an electric current, and accordingly it may be determined that what is damaged is the USB controller. If, in this case, the power-supply detecting circuit does not identify that an electric current passes, then it may be determined that what is damaged is the accessing USB device. Therefore, by the enumeration state of a USB device and the mutual operation and influence with the power-supply detecting circuit, the problematic device may be accurately and quickly determined, which saves the time spent on the determination on the problematic device, and effectively improves the reliability of the USB interfaces.

Figure 6:
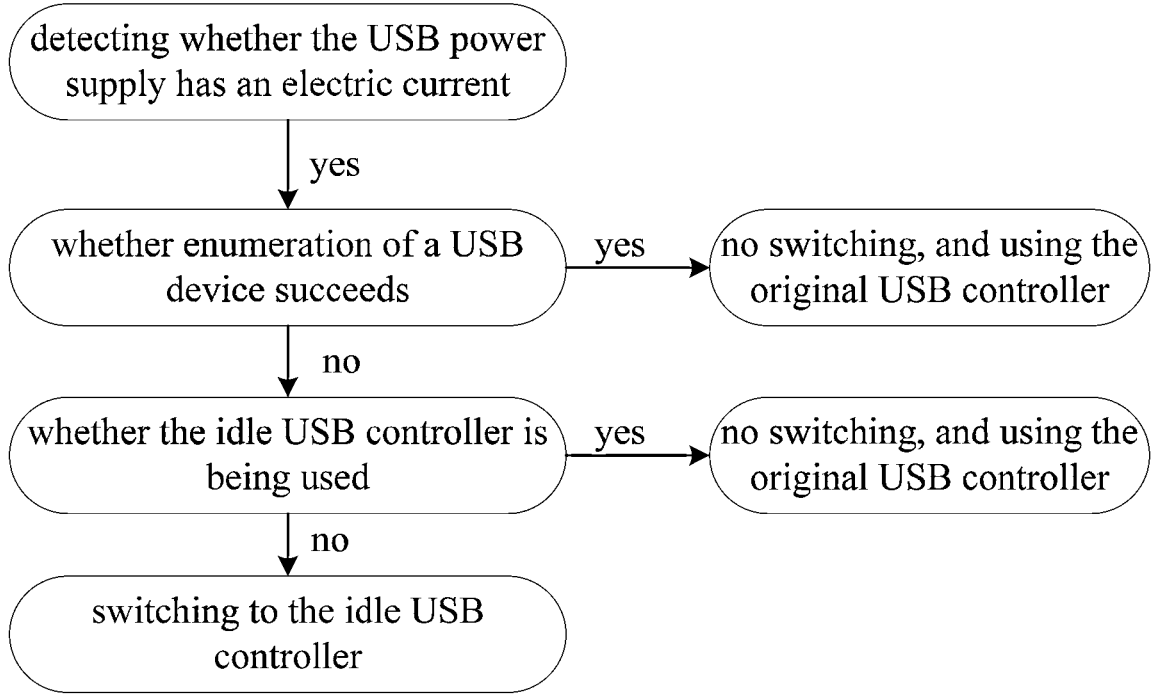
FIG. 6 is a schematic flow chart of a method for switching USB controllers according to some embodiments of the present application.

In order to enable a person skilled in the art to comprehend the technical solutions of the present application better, the technical solutions of the present application will be illustratively described below with reference to an example:

Referring to FIG. 6, FIG. 6 shows a schematic flow chart of a method for switching USB controllers according to some embodiments of the present application. As shown in FIG. 6, it is detected whether the power line of the USB socket outputs an electric current of the USB interface in the USB socket. If the power line of the USB socket outputs an electric current of the USB interface in the USB socket, it is detected whether enumeration of a USB device that has accessed the USB interface succeeds. If the enumeration of a USB device that has accessed the USB interface succeeds, it is not required to switch the USB controller, and the original operating USB controller may be used. In addition, if the enumeration of a USB device that has accessed the USB interface fails, the USB controllers may be switched according to the usage state of the idle USB controller. In some embodiments, the method further comprises: if the idle USB controller is being used, using the operating USB controller to operate, and if the idle USB controller is not being used, switching from the operating USB controller to the idle USB controller to operate.

In some embodiments, the method is applied for the USB circuit stated above, by detecting whether the power line of the USB socket outputs an electric current of the USB interface in the USB socket, if the power line of the USB socket outputs an electric current of the USB interface in the USB socket, detecting whether enumeration of a USB device that has accessed the USB interface succeeds, and if the enumeration of a USB device that has accessed the USB interface fails, according to a usage state of the idle USB controller, switching the USB controllers. In some embodiments, by detecting the electric current in the power line of the USB socket, and by the existence or non-existence of a power-supply current, it is determined whether a USB device has been inserted into the external USB socket or not, and, at the same time, by referring to the enumeration state of a USB device, it is determined whether the USB controller is normal. If a USB device is unidentifiable or not enumerated due to abnormality of the USB controller, then the recovery of the normal function of the USB interface may be realized by switching the USB controllers, thereby improving the robustness and the reliability of the external USB interfaces.

Moreover, when the USB interface in the USB socket has been accessed by a USB device, it may be detected by the power-supply detecting circuit that the power line of the USB socket outputs an electric current. If, at this point, the enumeration (identification on a USB device by the main control) fails, or, in other words, an inserted USB device cannot be identified, then damage of the USB controller or damage of the main control device that controls the USB controller may be determined. In this case, the switching switch may be used to switch the operating USB controller to the idle USB controller to realize the backing-up, which improves the reliability of the external USB interfaces. In addition, if merely the switching switch is added but the power-supply detecting circuit is not added, the switching of the USB controllers may still be performed. However, when, similarly, the USB interface in the USB socket has been accessed by a USB device and the enumeration fails, the main control device firstly considers that the USB interface in the USB socket is not inserted by a USB device but does not consider that the USB controller is damaged; in other words, it cannot determine the problematic device immediately. However, if the power-supply detecting circuit is added, the power-supply detecting circuit may be used to detect that the power line of the USB socket outputs an electric current, and accordingly it may be determined that what is damaged is the USB controller. If, in this case, the power-supply detecting circuit does not identify that an electric current passes, then it may be determined that what is damaged is the accessing USB device. Therefore, by the enumeration state of a USB device and the mutual operation and influence with the power-supply detecting circuit, the problematic device may be accurately and quickly determined, which saves the time spent on the determination on the problematic device, and effectively improves the reliability of the USB interfaces.

It should be noted that, regarding the process embodiments, for brevity of the description, all of them are expressed as the combination of a series of actions, but a person skilled in the art should know that some embodiments of the present application are not limited by the sequences of the actions that are described, because, according to some embodiments of the present application, some of the steps may have other sequences or be executed simultaneously. Secondly, a person skilled in the art should also know that all of the embodiments described in the description are preferable embodiments, and not all of the actions that they involve are required by some embodiments of the present application.

Figures 7, 8:
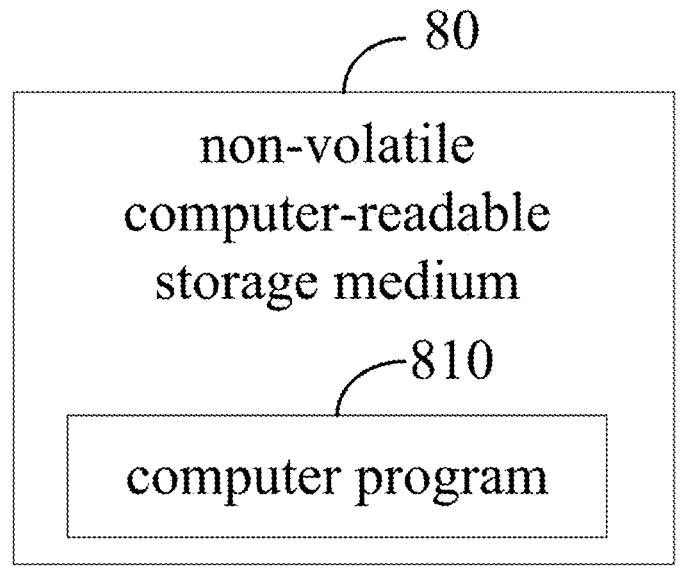
FIG. 7 is a structural block diagram of an apparatus for switching USB controllers according to some embodiments of the present application.
FIG. 8 is a schematic structural diagram of a non-volatile computer-readable storage medium according to some embodiments of the present application.

Referring to FIG. 7, FIG. 7 shows a structural block diagram of an apparatus for switching USB controllers according to some embodiments of the present application. The apparatus may particularly comprise the following modules:

a current detecting module 701 configured for detecting whether the power line of the USB socket outputs an electric current of the USB interface in the USB socket;

an enumeration-state detecting module 702 configured for, in response to the power line of the USB socket outputting an electric current of the USB interface in the USB socket, detecting whether enumeration of a USB device that has accessed the USB interface succeeds; and a USB-controller switching module 703 configured for, in response to the enumeration of a USB device that has accessed the USB interface failing, according to a usage state of the idle USB controller, switching the USB controllers.

In some embodiments, the current detecting module 701 is configured for:

in response to the USB interface in the USB socket having been accessed by a USB device and it being unidentifiable whether the USB interface has been accessed by the USB device, by using the power-supply detecting circuit, detecting whether the power line of the USB socket outputs an electric current of the USB interface in the USB socket.

In some embodiments, the apparatus further comprises:

a first judging module configured for, in response to it being detected by the power-supply detecting circuit that the power line of the USB socket outputs an electric current of the USB interface in the USB socket, determining that the USB interface in the USB socket has been accessed by the USB device; and a second judging module configured for, in response to it being not detected by the power-supply detecting circuit that the power line of the USB socket outputs an electric current of the USB interface in the USB socket, determining that the USB interface in the USB socket is not accessed by a USB device.

In some embodiments, the apparatus further comprises:

a default-controller operating module configured for, in response to the enumeration of a USB device that has accessed the USB interface succeeding, using the operating USB controller to operate.

In some embodiments, the apparatus further comprises:

a successful-enumeration module configured for, in response to the enumeration of a USB device that has accessed the USB interface succeeding, determining that the operating USB controller is in a normal state; and a failed-enumeration module configured for, in response to the enumeration of a USB device that has accessed the USB interface failing, determining that the operating USB controller is in an abnormal state.

In some embodiments, the USB-controller switching module 703 is configured for:

in response to the idle USB controller being used, using the operating USB controller to operate; and in response to the idle USB controller not being used, switching from the operating USB controller to the idle USB controller to operate.

In some embodiments, the apparatus further comprises:

an idle-USB-controller switching module configured for, in response to the operating USB controller being in the abnormal state, connecting a USB signal that was connected to the abnormal operating USB controller to the idle USB controller by using the switching switch.

In some embodiments, the apparatus further comprises:

an abnormal-USB-controller determining module configured for, in response to the power line of the USB socket outputting an electric current of the USB interface in the USB socket and it is unidentifiable whether the USB interface has been accessed by a USB device, determining that the operating USB controller is a USB controller having abnormality.

Regarding the device embodiments, because they are substantially similar to the process embodiments, they are described simply, and the related parts may refer to the description on the process embodiments.

In addition, some embodiments of the present application further provide an electronic device, wherein the electronic device comprises a processor, a memory and a computer program stored in the memory and executable in the processor, and the computer program, when executed by the processor, implements the steps of the embodiments of the method for switching USB controllers stated above, to obtain the same technical effect, which, in order to avoid replication, is not discussed further herein.

FIG. 8 is a schematic structural diagram of a non-volatile computer-readable storage medium according to some embodiments of the present application.

Some embodiments of the present application further provide a non-volatile computer-readable storage medium 80, wherein the non-volatile computer-readable storage medium 80 stores a computer program 810, and the computer program 810, when executed by a processor, implements the steps of the embodiments of the method for switching USB controllers stated above, to obtain the same technical effect, which, in order to avoid replication, is not discussed further herein. The non-volatile computer-readable storage medium 80 is, for example, a Read-Only Memory (referred to for short as ROM), a Random Access Memory (referred to for short as RAM), a diskette and an optical disk.

Figure 9:
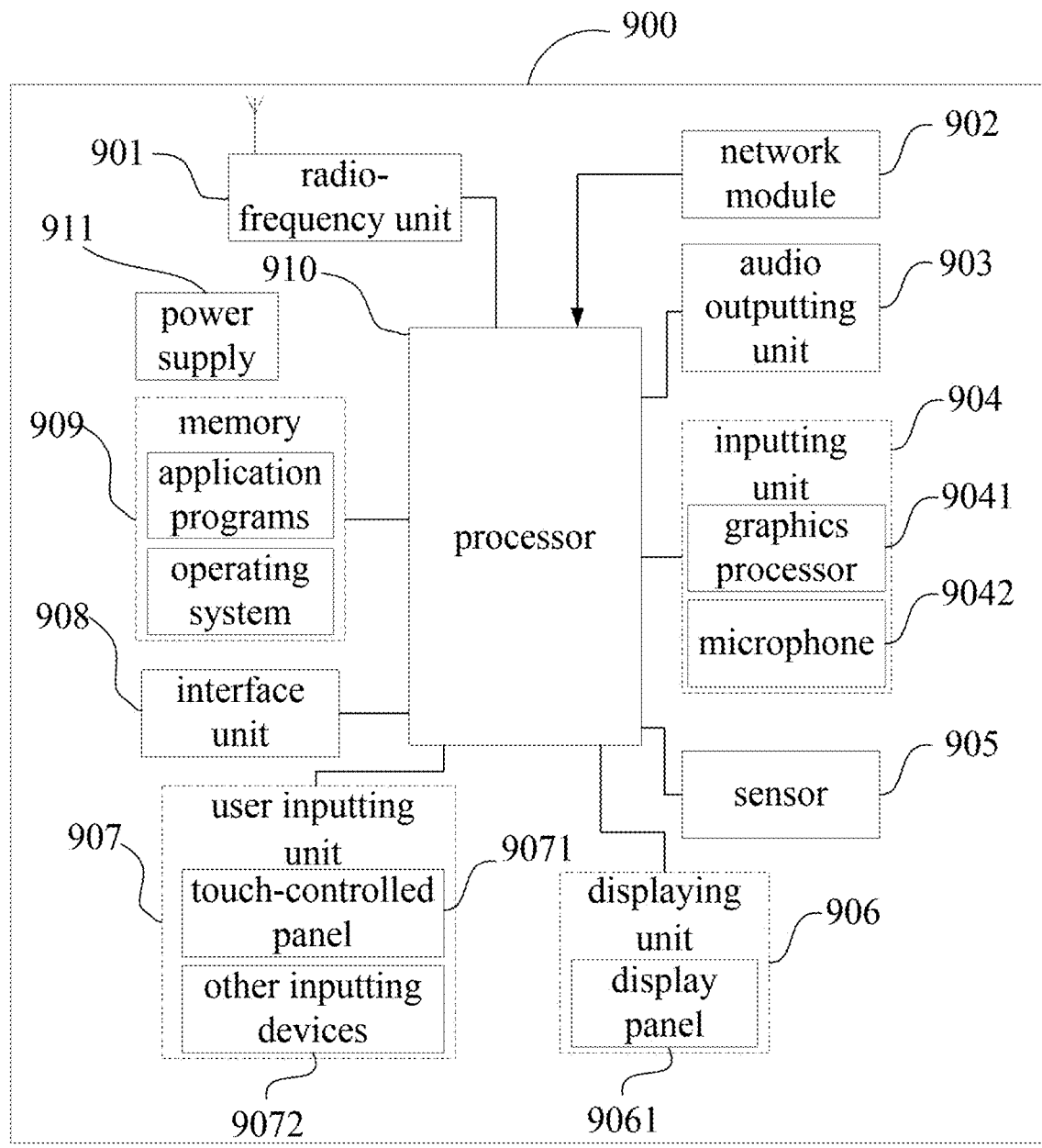
FIG. 9 is a schematic diagram of the hardware structure of an electronic device according to some embodiments of the present application.

FIG. 9 is a schematic diagram of the hardware structure of an electronic device according to some embodiments of the present application.

The electronic device 900 comprises, without limitation, components such as a radio-frequency unit 901, a network module 902, an audio outputting unit 903, an inputting unit 904, a sensor 905, a displaying unit 906, a user inputting unit 907, an interface unit 908, a memory 909, a processor 910 and a power supply 911. A person skilled in the art can understand that the structure of the electronic device shown in FIG. 9 does not limit the electronic device, and the electronic device may comprise components more or fewer than those shown in the figure or a combination of some of the components, or has a different arrangement of the components. In some embodiments, the electronic device includes but is not limited to a mobile phone, a tablet personal computer, a notebook computer, a palmtop, an on-board terminal, a wearable device and a pedometer.

It should be understood that, in some embodiments of the present application, the radio-frequency unit 901 may be used for receiving and emitting information, or receiving and emitting the signals in a communication process. In some embodiments, it receives the downlink data from a base station, and subsequently transfers to the processor 910 for processing. In addition, it emits the uplink data to the base station. Generally, the radio-frequency unit 901 includes but is not limited to an antenna, at least one amplifier, a transceiver, a coupler, a low-noise amplifier and a duplexer. Additionally, the radio-frequency unit 901 may communicate with a network and other devices via a wireless communication system.

The electronic device supplies wireless broadband Internet access to the user by using the network module 902, for example, facilitating the user to receive and send electronic mails, browse webpages and access streaming media.

The audio outputting unit 903 may convert audio data received by the radio-frequency unit 901 or the network module 902 or stored in the memory 909 into audio signals and output the audio signals as sounds. Furthermore, the audio outputting unit 903 may also provide audio outputs related to specific functions executed by the electronic device 900 (for example, a calling-signal-receiving sound and a message-receiving sound). The audio outputting unit 903 includes a loudspeaker, a buzzer, a telephone receiver and so on.

The inputting unit 904 is used for receiving audio or video signals. The inputting unit 904 may comprise a graphics processor (Graphics Processing Unit, GPU) 9041 and a microphone 9042. The graphics processor 9041 processes the image data of static pictures or videos that are obtained by an image capturing device (for example, a camera) in a video-capturing mode or an image-capturing mode. The image frames obtained by the processing may be displayed in the displaying unit 906. The image frames obtained by the processing by the graphics processor 9041 may be stored in the memory 909 (or another storage medium) or be emitted by the radio-frequency unit 901 or the network module 902. The microphone 9042 may receive sound, and can process such sound into audio data. The audio data obtained by the processing may, in a telephone-call mode, be converted into a format output that can be sent to a mobile-communication base station by the radio-frequency unit 901.

The electronic device 900 further comprises at least one sensor 905, for example, an optical sensor, a motion sensor and another sensor. In some embodiments, the optical sensor includes an ambient-light sensor and a proximity sensor. The ambient-light sensor may regulate the brightness of a display panel 9061 according to the magnitude of the ambient light. The proximity sensor may, when the electronic device 900 has moved near the ear, close the display panel 9061 and/or the backlight. As a type of the motion sensor, an accelerometer sensor may detect the magnitudes of the accelerations in the directions (generally, three axes), may, in the stationary state, detect the magnitude and the direction of the gravity, and may be used for identification on the pose of the electronic device (for example, switching between horizontal screen and vertical screen, the related games, and pose calibration of a magnetometer), functions related to vibration identification (for example, a pedometer, and knocking) and so on. The sensor 905 may further include a fingerprint sensor, a pressure sensor, an iris sensor, a molecule sensor, a gyroscope, a barometer, a hygrometer, a thermometer, an infrared sensor and so on, which is not discussed further herein.

The displaying unit 906 is used for displaying the information inputted by the user or the information provided to the user. The displaying unit 906 may comprise the display panel 9061, and the display panel 9061 may be configured in the form of a Liquid Crystal Display (LCD), an Organic Light Emitting Diode (OLED) and so on.

The user inputting unit 907 may be used for receiving inputted number or character information, and generating signal inputs related to the user setting and the function controlling of the electronic device. In some embodiments, the user inputting unit 907 comprises a touch-controlled panel 9071 and other inputting devices 9072. The touch-controlled panel 9071 is also referred to as a touch screen, and may collect the touching operations by the user thereon or therenear (for example, the operations on the touch-controlled panel 9071 or near the touch-controlled panel 9071 by the user using any suitable object or component such as a finger and a touchpen). The touch-controlled panel 9071 may comprise a touching detecting device and a touching controller. The touching detecting device detects the azimuth of the touching by the user, detects the signal caused by the touching operation, and transmits the signal to the touching controller. The touching controller receives the touching information from the touching detecting device, converts it into a contact-point coordinate, sends the contact-point coordinate to the processor 910, receives the command sent by the processor 910, and executes the command. Additionally, the touch-controlled panel 9071 may be embodied as various types such as a resistor type, a capacitor type, an infrared type and a surface-acoustic-wave type. Besides the touch-controlled panel 9071, the user inputting unit 907 may further comprise other inputting devices 9072. In some embodiments, the other inputting devices 9072 may include but are not limited to a physical keyboard, function keys (for example, a volume controlling press key and a switch press key), a trackball, a mouse and a joystick, which is not discussed further herein.

Furthermore, the touch-controlled panel 9071 may cover the display panel 9061. The touch-controlled panel 9071, when has detected a touching operation thereon or therenear, transmits it to the processor 910 to determine the type of the touching event, and subsequently the processor 910, according to the type of the touching event, provides the corresponding visual output on the display panel 9061. Although, in FIG. 9, the touch-controlled panel 9071 and the display panel 9061 implement the inputting function and the outputting function of the electronic device as two independent components, in some embodiments, the touch-controlled panel 9071 and the display panel 9061 may be integrated to implement the inputting function and the outputting function of the electronic device, which is not particularly limited herein.

The interface unit 908 is the interfaces for the connection of external devices to the electronic device 900. For example, the external devices may include a wired or wireless head-mounted earphone port, an external power supply (or battery charger) port, a wired or wireless data port, a memory card port, a port for connecting a device having an identifying module, an audio inputting/outputting (I/O) port, a video I/O port, an earphone port and so on. The interface unit 908 may be used for receiving the inputs from the external devices (for example, data information, and electric power) and transmitting the received inputs to one or more elements in the electronic device 900, or may be used for transmitting data between the electronic device 900 and the external devices.

The memory 909 may be used for storing software programs and various data. The memory 909 may mainly comprise a program storing region and a data storing region. The program storing region may store an operating system, application programs required by at least one function (for example, a sound playing function and an image playing function), and so on. The data storing region may store the data created in the usage of a mobile phone (for example, audio data, and a telephone book) and so on. Additionally, the memory 909 may comprise a high-speed random access memory, and may also comprise a non-volatile memory, for example, at least one magnetic-disk storage device, flash-memory device or another volatile solid-state memory device.

The processor 910 is the controlling center of the electronic device, is connected to the parts of the entire electronic device by various interfaces and lines, and, by executing the software programs and/or modules stored in the memory 909, and invoking the data stored in the memory 909, performs the various functions of the electronic device and processes the data, thereby overall monitoring the electronic device. The processor 910 may comprise one or more processing units. Preferably, the processor 910 may be integrated with an application processor and a modulation-demodulation processor, wherein the application processor mainly handles the operating system, the user interface, the application programs and so on, and the modulation-demodulation processor mainly handles the wireless communication. It can be understood that the modulation-demodulation processor may not be integrated into the processor 910.

The electronic device 900 may further comprise a power supply 911 that supplies electric power to the components (for example, a battery). Preferably, the power supply 911 may be logically connected to the processor 910 by a power-supply managing system, whereby the functions such as charging, discharging and power-consumption management are realized by using the power-supply managing system.

In addition, the electronic device 900 comprises some functional modules that are not shown, which are not discussed further herein.

It should be noted that the terms "include", "comprise" or any variants thereof, as used herein, are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

From the description on the above embodiments, a person skilled in the art can clearly know that the method according to the above embodiments may be implemented by means of software plus a necessary generic hardware platform, and, certainly, may also be implemented by hardware, but in many circumstances the former is a more preferable embodiment. On the basis of such a comprehension, the substance of the technical solutions of the present application, or the part thereof that makes a contribution over the prior art, may be embodied in the form of a software product. The computer software product is stored in a storage medium (such as a ROM/RAM, a diskette and an optical disk), and contains multiple instructions configured so that a terminal (which may be a mobile phone, a computer, a server, an air conditioner, a network device and so on) implements the methods according to the embodiments of the present application.

The embodiments of the present application are described above with reference to the drawings. However, the present application is not limited to the above particular embodiments. The above particular embodiments are merely illustrative, rather than limitative. A person skilled in the art, under the motivation of the present application, can make many variations without departing from the spirit of the present application and the protection scope of the claims, and all of the variations fall within the protection scope of the present application.

A person skilled in the art can envisage that the units and the algorithm steps of the examples described with reference to the embodiments disclosed in some embodiments of the present application may be implemented by using electronic hardware or a combination of computer software and electronic hardware. Whether those functions are executed by hardware or software depends on the particular applications and the design constraints of the technical solutions. A person skilled in the art may employ different methods to implement the described functions with respect to each of the particular applications, but the implementations should not be considered as extending beyond the scope of the present application.

A person skilled in the art can clearly understand that, in order for the convenience and concision of the description, the particular working processes of the above-described systems, devices and units may refer to the corresponding processes according to the above-described process embodiments, and are not discussed further herein.

In the embodiments of the present application, it should be understood that the disclosed apparatus and method may be implemented in other manners. For example, the above-described device embodiments are merely illustrative. For example, the division between the units is merely a division in the logic functions, and in practical implementations there may be another mode of division. For example, multiple units or components may be combined or may be integrated into another system, or some of the features may be omitted, or not implemented. Additionally, the coupling or direct coupling or communicative connection between the illustrated or discussed components may be via interfaces or the indirect coupling or communicative connection between the devices or units, and may be electric, mechanical or in other forms.

The units that are described as separate components may or may not be physically separate, and the components that are displayed as units may or may not be physical units; in other words, they may be located at the same one location, and may also be distributed to a plurality of network units. Some or all of the units may be selected according to practical demands to realize the purposes of the solutions of the embodiments.

Furthermore, the functional units according to the embodiments of the present application may be integrated into one processing unit, or the units may also separately physically exist, or two or more of the units may also be integrated into one unit.

The functions, if embodied in the form of software function units and sold or used as an independent product, may be stored in a computer-readable storage medium. On the basis of such a comprehension, the substance of the technical solutions of the present application, or the part thereof that makes a contribution over the prior art, or part of the technical solutions, may be embodied in the form of a software product. The computer software product is stored in a storage medium, and contains multiple instructions configured so that a computer device (which may be a personal computer, a server, a network device and so on) implements all or some of the steps of the methods according to the embodiments of the present application. Moreover, the storage medium includes various media that can store a program code, such as a USB flash disk, a mobile hard disk drive, an ROM, an RAM, a diskette and an optical disk.

The above are merely particular embodiments of the present application, and the protection scope of the present application is not limited thereto. All of the variations or substitutions that a person skilled in the art can easily envisage within the technical scope disclosed by the present application should fall within the protection scope of the present application. Therefore, the protection scope of the present application should be subject to the protection scope of the claims.

The invention claimed is:

1. A USB (Universal Serial Bus) circuit, wherein the USB circuit comprises a USB socket, USB controllers, switching switches and a power-supply detecting circuit, each of the switching switches and the power-supply detecting circuit are connected in series to a power line of the USB socket, and the USB controllers include an operating USB controller and an idle USB controller, wherein the operating USB controller is a default USB controller that is, when normally operating, connected to the switching switches, and the idle USB controller is a standby USB controller that is connected to the switching switches when the operating USB controller has abnormality;

wherein each of the switching switches is configured for decomposing a USB signal transmitted in the power line of the USB socket into a plurality of channels of signals, and connecting the plurality of channels of the USB signals obtained by the decomposing to the operating USB controller and the idle USB controller; wherein each of the switching switches has a built-in switching chip, the built-in switching chip comprises a selecting lead, and the selecting lead is configured for selecting the operating USB controller or the idle USB controller, and the idle USB controller and the switching switches are in a star connection;

wherein the power-supply detecting circuit is configured to determine whether the USB interface in the USB socket has been accessed by a USB device by detecting whether the power line of the USB socket outputs an electric current of a USB interface in the USB socket;

wherein when the USB interface in the USB socket has been accessed by the USB device, it is detected by the power-supply detecting circuit that the power line of the USB socket outputs an electric current; if, at this point, an inserted USB device cannot be identified, then damage of the USB controller or damage of a main control device that controls the USB controller is determined, and the switching switch is used to switch the operating USB controller to the idle USB controller; the power-supply detecting circuit is used to detect that the power line of the USB socket outputs an electric current, and accordingly it is determined that what is damaged is the USB controller; if the power-supply detecting circuit does not identify that an electric current passes, then it is determined that what is damaged is an accessing USB device.

2. The USB circuit according to claim 1, wherein the USB circuit comprises at least two instances of the switching switches, and each of the switching switches corresponds to one instance of the USB socket.

3. The USB circuit according to claim 2, wherein the idle USB controller and the switching switches are in a star connection.

4. The USB circuit according to claim 1, wherein one instance of the USB socket corresponds to at least one instance of the operating USB controller and one instance of the idle USB controller.

5. The USB circuit according to claim 4, wherein in response to the operating USB controller having abnormality, a USB signal that was connected to the abnormal USB controller is connected to the idle USB controller by using the switching switches.

6. The USB circuit according to claim 1, wherein in response to the USB interface in the USB socket having been accessed by a USB device and it being unidentifiable whether the USB interface has been accessed by the USB device, the power-supply detecting circuit detects whether the power line of the USB socket outputs an electric current of the USB interface in the USB socket to determine whether the USB interface in the USB socket has been accessed by the USB device.

7. The USB circuit according to claim 6, wherein in response to it being detected by the power-supply detecting circuit that the power line of the USB socket outputs an electric current of the USB interface in the USB socket, it is determined that the USB interface in the USB socket has been accessed by the USB device; and in response to it being not detected by the power-supply detecting circuit that the power line of the USB socket outputs an electric current of the USB interface in the USB socket, it is determined that the USB interface in the USB socket is not accessed by a USB device.

8. The USB circuit according to claim 6, wherein in response to it being unidentifiable whether the USB interface has been accessed by a USB device, it is determined that the operating USB controller is a USB controller having abnormality.

9. The USB circuit according to claim 1, wherein the USB circuit further comprises a power-supply overcurrent-protection circuit, and both the power-supply overcurrent-protection circuit and the power-supply detecting circuit are connected to the USB socket in series, and the power-supply overcurrent-protection circuit is configured for monitoring whether an electric current of the USB interface in the USB socket is greater than a preset current value.

10. A method for switching USB controllers, wherein the method is applied for the USB circuit according to claim 1, and the method comprises:

detecting whether the power line of the USB socket outputs an electric current of the USB interface in the USB socket;

in response to the power line of the USB socket outputting an electric current of the USB interface in the USB socket, detecting whether enumeration of a USB device that has accessed the USB interface succeeds; and in response to the enumeration of a USB device that has accessed the USB interface failing, according to a usage state of the idle USB controller, switching the USB controllers.

11. The method according to claim 10, wherein the step of detecting whether the power line of the USB socket outputs the electric current of the USB interface in the USB socket comprises:

in response to the USB interface in the USB socket having been accessed by a USB device and it being unidentifiable whether the USB interface has been accessed by the USB device, by using the power-supply detecting circuit, detecting whether the power line of the USB socket outputs an electric current of the USB interface in the USB socket.

12. The method according to claim 11, wherein the method further comprises:

in response to it being detected by the power-supply detecting circuit that the power line of the USB socket outputs an electric current of the USB interface in the USB socket, determining that the USB interface in the USB socket has been accessed by the USB device; and in response to it being not detected by the power-supply detecting circuit that the power line of the USB socket outputs an electric current of the USB interface in the USB socket, determining that the USB interface in the USB socket is not accessed by a USB device.

13. The method according to claim 10, wherein the method further comprises:

in response to the enumeration of a USB device that has accessed the USB interface succeeding, using the operating USB controller to operate.

14. The method according to claim 13, wherein the method further comprises:

in response to the enumeration of a USB device that has accessed the USB interface succeeding, determining that the operating USB controller is in a normal state; and in response to the enumeration of a USB device that has accessed the USB interface failing, determining that the operating USB controller is in an abnormal state.

15. The method according to claim 10, wherein the step of, according to the usage state of the idle USB controller, switching the USB controllers comprises:

in response to the idle USB controller being used, using the operating USB controller to operate; and in response to the idle USB controller not being used, switching from the operating USB controller to the idle USB controller to operate.

16. The method according to claim 14, wherein the method further comprises:

in response to the operating USB controller being in the abnormal state, connecting a USB signal that was connected to the abnormal operating USB controller to the idle USB controller by using the switching switches.

17. The method according to claim 10, wherein the method further comprises:

in response to the power line of the USB socket outputting an electric current of the USB interface in the USB socket and it is unidentifiable whether the USB interface has been accessed by a USB device, determining that the operating USB controller is a USB controller having abnormality.

18. An electronic device, wherein the electronic device comprises a processor, a communication interface, a memory and a communication bus, and the processor, the communication interface and the memory complete communication therebetween via the communication bus;

the memory is configured for storing a computer program; and the processor is configured for, when executing the computer program stored in the memory, implementing the method according to claim 10.

19. A non-transitory computer-readable storage medium, wherein the non-transitory computer-readable storage medium stores an instruction, and the instruction, when executed by one or more processors, causes the processors to implement the method claim 10.

* * * * *